United States Patent
Brandwine et al.

(10) Patent No.: US 8,559,324 B1
(45) Date of Patent: Oct. 15, 2013

(54) NETWORK ROUTING METERING

(75) Inventors: Eric Jason Brandwine, Haymarket, VA (US); Swaminathan Sivasubramanian, Seattle, WA (US); Bradley E. Marshall, Bainbridge Island, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 602 days.

(21) Appl. No.: 12/825,698

(22) Filed: Jun. 29, 2010

(51) Int. Cl.
*H04L 12/26* (2006.01)
*H04L 12/28* (2006.01)
*H04L 12/54* (2013.01)
*G06F 15/173* (2006.01)
*H04M 15/00* (2006.01)
*G06F 15/16* (2006.01)

(52) U.S. Cl.
USPC .......... 370/252; 370/351; 370/428; 709/223; 709/238; 709/242; 379/114.01

(58) Field of Classification Search
USPC ......... 370/252, 231, 232, 235, 236, 237, 351, 370/395.31, 399, 400, 428, 449, 475; 709/203, 223, 224, 238, 242; 379/114.01
See application file for complete search history.

(56) References Cited

U.S. PATENT DOCUMENTS 8,023,425 B2 * 9/2011 Raleigh ................... 370/252
2010/0118714 A1 * 5/2010 Labovitz ................. 370/252

OTHER PUBLICATIONS

Counter Hack Reloaded A Step-By-Step Guide to Computer Attacks and Effective Defenses, Second Edition, Ed Skoudis, et al., dated Nov. 2006, pp. 59-66.

* cited by examiner

*Primary Examiner* — Alpus H Hsu
*Assistant Examiner* — Dharmesh Patel
(74) *Attorney, Agent, or Firm* — Knobbe Martens Olson & Bear LLP

(57) ABSTRACT

Systems, methods, and computer-readable media for network routing metering are disclosed. In some embodiments, various changes to the routes, and other actions requested by a computer system, physical or virtual, can be metered. Those actions may be performed and later rated in order to determine what amount, if any, to charge an account associated with the requesting network participant system. The network participant system can be billed based on the activities performed on its behalf. Therefore, even if a network is performing poorly and requires more resources that would normally be allowed by a neighboring router, if the network owner pays to have these requests performed, then the embodiments herein can allocate more resources to supporting the network's rapidly changing network.

21 Claims, 12 Drawing Sheets

ROUTING TABLE
*1100*
| | NETWORK 1 | NETWORK 2 | NETWORK 3 | ... | NETWORK N |
|---|---|---|---|---|---|
| NETWORK ID 1110 | ID1 | ID2 | ID3 | ... | IDN |
| NETWORK METRIC 1112 | MT1 | MT2 | MT3 | ... | MTN |
| NEXT HOP 1114 | AD1 | AD2 | AD3 | ... | ADN |
| QUALITY OF SERVICE 1116 | U | U | U | ... | U |
| INTERFACE 1118 | ETH0 | ETH1 | ETH2 | ... | ETHN |
*1120*
```
<?XML VERSION="1.0"NCODING='UTF-8'?>
    <NETWORK>
         <NETWORK ID> ID1 </NETWORK ID>
         <NETWORK METRIC> MT1 </NETWORK METRIC>
         <NEXT HOP> AD1 </ NEXT HOP>
         <INTERFACE> ETH0 </INTERFACE>
    <NETWORK>
    ...
```
*FIG. 11*

NETWORK ROUTING METERING

BACKGROUND

Generally described, computing devices utilize a communication network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted among multiple physical networks, or sub-networks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

To execute the control plane functionality, routers can maintain a forwarding information base ("FIB") that identifies, among other packet attribute information, destination information for at least a subset of possible network addresses, such as Internet Protocol ("IP") addresses. In a typical embodiment, the FIB corresponds to a table of values specifying network forwarding information for the router.

With the advent of virtualization technologies, networks and routing for those networks can now be simulated using commodity hardware rather than actual routers. For example, virtualization technologies such as those provided by VMWare, XEN, or User-Mode Linux can allow a single physical computing machine to be shared among multiple virtual networks by providing each virtual network user with one or more virtual machines hosted by the single physical computing machine, with each such virtual machine being a software simulation acting as a distinct logical computing system that provides users with the illusion that they are the sole operators and administrators of a given hardware computing resource. In addition, as routing is accomplished through software, additional routing flexibility is provided to the virtual network in comparison with traditional routing, such as allowing the use of supplemental information for determining network routing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 depicts a representation of a routing table and an XML representation of a routing table.

DETAILED DESCRIPTION

Figure 1:
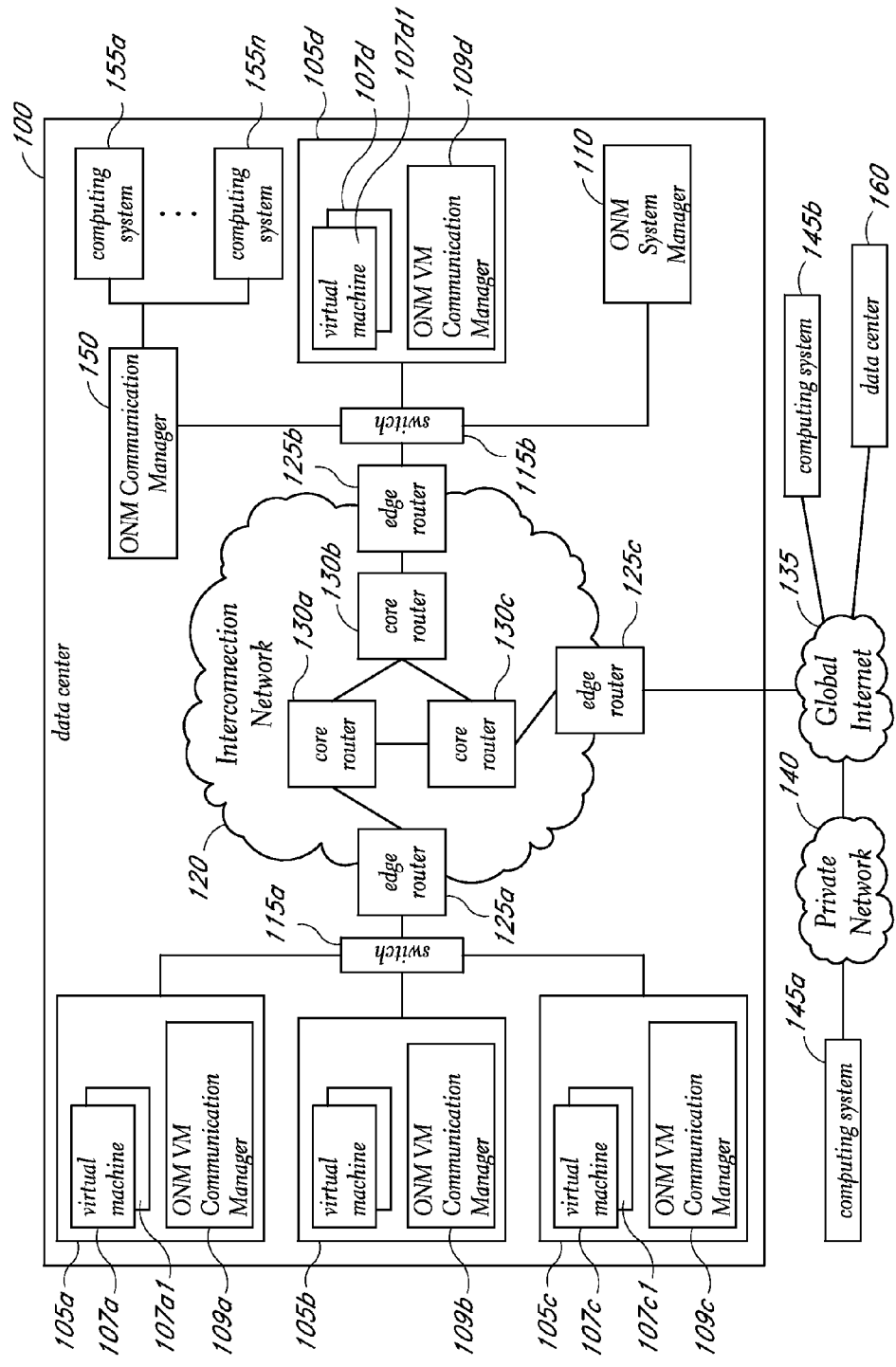
FIG. 1 is a network diagram illustrating an embodiment of a substrate network having computing nodes associated with a virtual computer network.

In most networks, multiple networks systems are interconnected and interdependent. When one network makes a change, depending on peering and transit relationships between networks, that change can propagate through neighboring networks. In the case of physical network routing equipment, constraints on the numbers of routes that can be stored and the rate at which routes can be changed are often fixed or tightly constrained. For routing systems running in software, the constraints can be softer, but the available resources are not infinite. In such systems, there are limited resources for storing routing and forwarding tables.

When one actor or network within a broader system of networks is announcing numerous routes or otherwise performing "poorly," the neighboring networks can suffer because of the strain that the poorly performing network places on their resources. Examples of poorly performing networks can those of merged or acquired companies, where the networks can never have been properly integrated, or networks that have been built without an eye towards network engineering. Typically, in order to counteract the effects of a poorly performing neighboring network, a router can simply stop accepting changes or stop accepting packets from the poorly performing neighbor. This may not be the best solution, however.

In embodiments herein, various changes to the routes, packets forwarded, and other actions requested by a neighboring network can be metered. An account associated with the neighboring network can be charged based on the network activities it requests. Therefore, even if the network is performing poorly and is continuously announcing changes, if the neighboring network owner is willing to pay to have these changes accepted, then embodiments herein can allocate more resources to support this network neighbor's rapidly changing network and its other network activities.

The following section discusses various embodiments of managed networks for routing metering. Following that is further discussion of routing metering.

Managed Computer Networks for Routing Metering

With the advent of virtualization technologies, networks and routing for those networks can now be simulated using commodity hardware rather than actual routers. For example, virtualization technologies can be adapted to allow a single physical computing machine to be shared among multiple virtual networks by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual network in comparison with traditional routing. As a result, in some implementations, supplemental information other than packet information can be used to determine network routing.

In this disclosure, techniques are described for providing logical networking functionality for managed computer networks, such as for virtual computer networks that are provided on behalf of users or other entities. In at least some embodiments, the techniques enable a user to configure or specify a network topology, routing costs, and/or routing paths for a virtual or overlay computer network including logical networking devices that are each associated with a specified group of multiple physical computing nodes. With the network configuration specified for a virtual computer network, the functionally and operation of the virtual network can be simulated on physical computing nodes operating virtualization technologies. In some embodiments, multiple users or entities (e.g. businesses or other organizations) can access the system as tenants of the system, each having their own virtual network in the system. In one embodiment, a user's access and/or network traffic is transparent to other users. For example, even though physical components of a network may be shared, a user of a virtual network may not see another user's network traffic on another virtual network if monitoring traffic on the virtual network.

Figure 2:
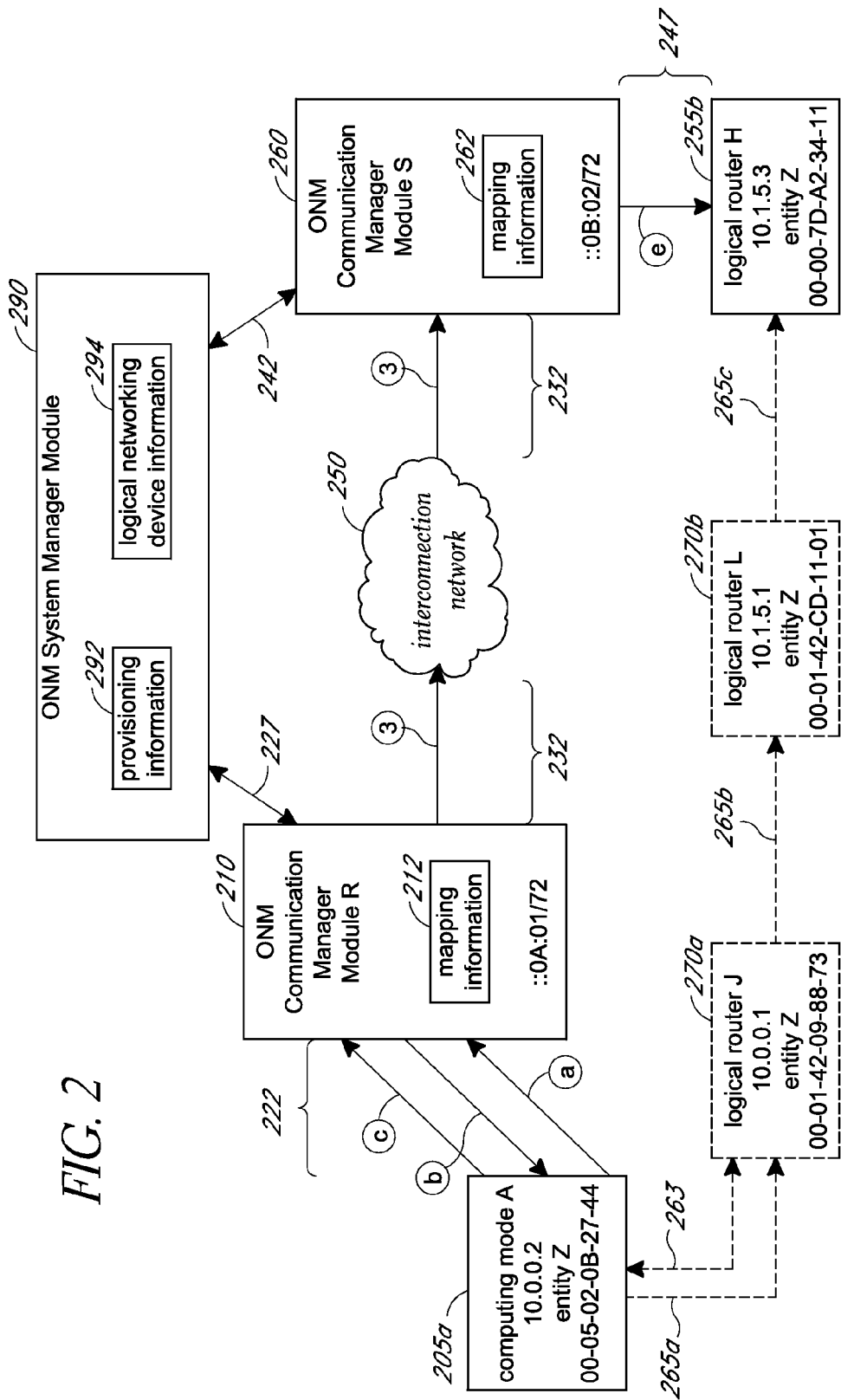
FIG. 2 illustrates an example embodiment of a virtual computer network supporting logical networking functionality.

By way of overview, FIGS. 1 and 2 discuss embodiments where communications between multiple computing nodes of the virtual computer network emulate functionality that would be provided by logical networking devices if they were physically present. In some embodiments, some or all of the emulation are performed by an overlay network manager system. FIGS. 2-4B and 7B discuss embodiments where substrate routing decisions can be made independently of any simulated routing in the overlay network, allowing, for example, optimization of traffic on the substrate network based on information unavailable to a virtual network user. FIGS. 5A-7A discuss embodiments where routing decisions implemented on the virtual or overlay network are propagated to the substrate network. Thus, a user can specify cost functions for the overlay network that can be used to make routing decisions in the substrate network.

Overlay Network Manager

FIG. 1 is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the 1private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d. Physical computing systems 155a-155n do not execute any virtual machines in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager modules 109, 150 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be interconnected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a and/or 109c on the host computing systems 105a and 105c can perform additional actions that correspond to one or more logical specified router devices lying between computing nodes 107a1 and 107c1 in the virtual network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1 supporting logical networking functionality. The ONM system includes more detailed embodiments of the ONM System Manager and ONM Communication Manager of FIG. 1. In FIG. 2, computing node A is sending a communication to computing node H, and the actions of the physically implemented modules 210 and 260 and devices of network 250 in actually sending the communication are shown, as well as emulated actions of the logical router devices 270a and 270b in logically sending the communication.

In this example, computing nodes A 205a and H 255b are part of a single virtual computer network for entity Z. However, computing nodes can be configured to be part of two distinct sub-networks of the virtual computer network and the logical router devices 270a and 270b separate the computing nodes A and H in the virtual network topology. For example, logical router device J 270a can be a local router device to computing node A and logical router device L 270*b* can be a local router device to computing node H.

In FIG. 2, computing nodes A 205*a* and H 255*b* includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The System Manager module 290 maintains provisioning information 292 that identifies where each computing node is actually located and to which entity and/or virtual computer network the computing node belongs.

In this example, computing node A 205*a* first sends an address resolution protocol (ARP) message request 222-*a* for virtual hardware address information, where the message is expected to first pass through a logical device J before being forwarded to computing node H. Accordingly, the ARP message request 222-*a* includes the virtual network address for logical router J (e.g., "10.0.0.1") and requests the corresponding hardware address for logical router J.

Communication Manager module R intercepts the ARP request 222-*a*, and obtains a hardware address to provide to computing node A as part of spoofed ARP response message 222-*b*. The Communication Manager module R can determine the hardware address by, for example, looking up various hardware address information in stored mapping information 212, which can cache information about previously received communications. Communication Manager module R can communicate 227 with the System Manager module 290 to translate the virtual network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-*b*. While request 222-*a* and response message 222-*b* actually physically pass between computing node A and Communication Manager module R, from the standpoint of computing node A, its interactions occur with local router device J.

After receiving the response message 222-*b*, computing node A 205*a* creates and initiates the sending of a communication 222-*c* to computing node H 255*b*. From the standpoint of computing node A, the sent communication will be handled as if logical router J 270*a* were physically implemented. For example, logical router J could modify the header of the communication 265*a* and forward the modified communication 265*b* to logical router L 270*a*, which would similarly modify the header of the communication 265*b* and forward the modified communication 265*c* to computing node H. However, communication 222-*c* is actually intercepted and handled by Communication Manager module R, which modifies the communication as appropriate, and forwards the modified communication over the interconnection network 250 to computing node H by communication 232-3.

Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-*c* by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270*a*, 270*b* and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; or the like.

Route Selection on Substrate Network

Figure 3:
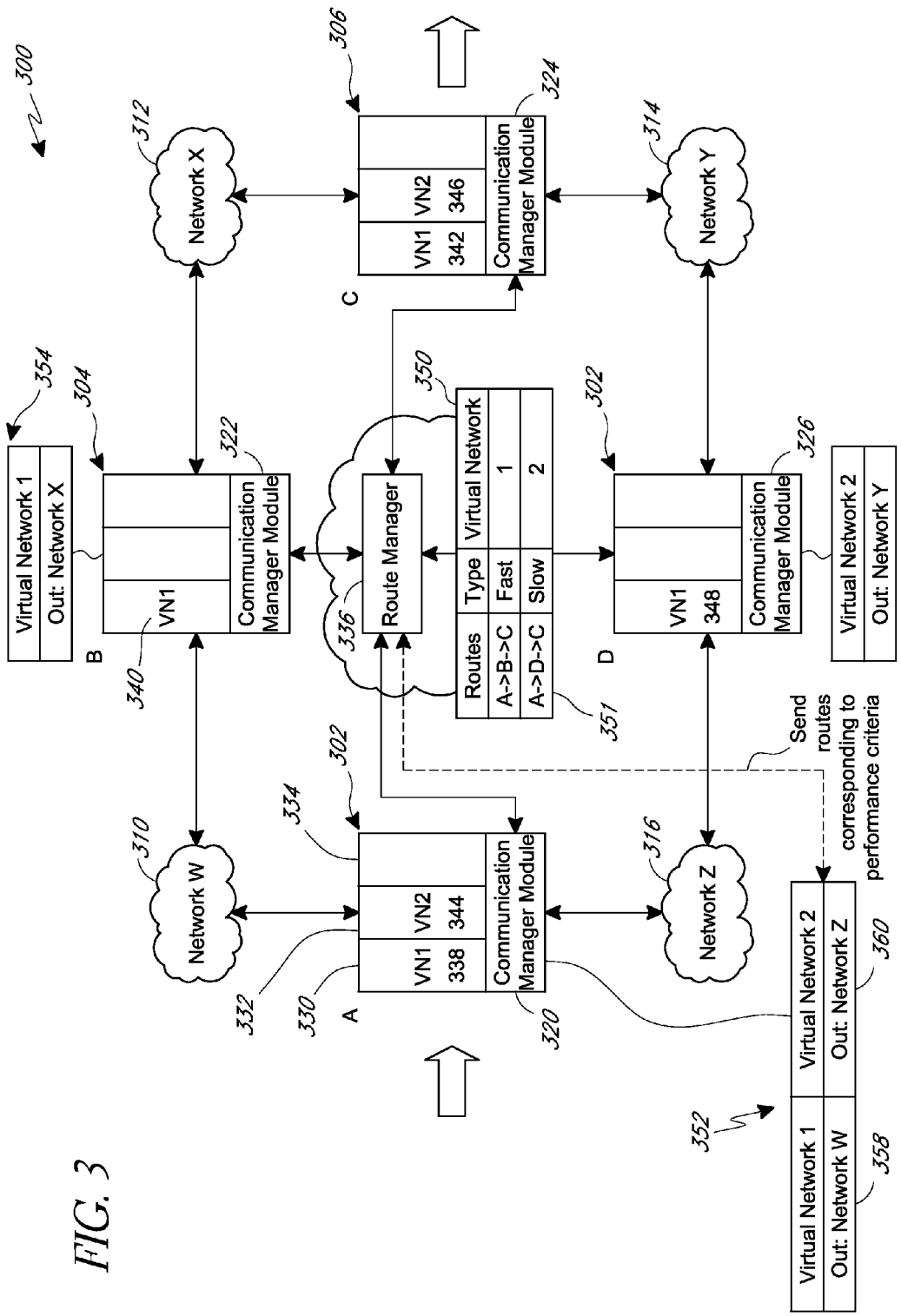
FIG. 3 illustrates an example embodiment of a substrate network configuration wherein routes are determined for associated overlay networks.

FIG. 3 illustrates an example embodiment of a substrate network 300 having a route manager 336 capable of determining routes for overlay networks. The substrate network 300 can be composed of one or more substrate components or nodes, such as computing nodes, routing nodes, communication links or the like. In FIG. 3, the substrate network 300 includes computing nodes A 302, B 304, C 306, and D 308, which are capable of simulating various components of one or more associated overlay networks. The nodes can be on the same data center or in multiple data centers. Computing node A is interconnected to node B via network W 310, node B is connected to node C by network X 312, node C is connected to node D by network Y 314, and node D is connected to node A by network Z 316. Networks W, X, Y, and Z can include one or more physical networking devices, such as routers, switches, or the like, and can include private or public connections. Components shown in FIG. 3, such as the computing nodes and communication manager modules, can implement certain of the features of embodiments described above with respect to FIGS. 1 and 2.

In FIG. 3, nodes A 302, B 304, C 306, and D 308 are associated with a respective Communication Manager module 320, 322, 324, and 326. The communication manager modules can implement certain of the features described in the Communication Manager 150, 210, 260 and VM Communication manager 109*a*, 109*b*, 109*c*, 109*d* of FIGS. 1 and 2. For example, the Communication Manager module 320 for node A can operate on a hypervisor monitor of the computing node and can direct the communication of one or more virtual computing nodes 330, 332, 334 of node A. The computing nodes, communication managers and Route Manager 336 can be part of the same ONM system. In one embodiment, the computing nodes run the XEN operating system (OS) or similar virtualization OS, with the communication managers operating on domain 0 or the first OS instance and the virtual computing nodes being domain U or additional OS instances.

The communication manager modules in FIG. 3 are in communication with a Route Manager module 336, operating on one or more computing devices, that directs routing for the substrate network 300. In one embodiment, the Route Manager operates as part of the ONM System Manager module 110, 290 of FIGS. 1 and 2, with functionally combined into a single module. The Route Manager can be located within a data center or at a regional level and direct traffic between data centers. In one embodiment, multiple Route Managers can operate in a distributed manner to coordinate routing across multiple data centers.

In FIG. 3, two virtual networks are associated with the substrate network 300. Virtual network 1 (VN1) has components 338, 340, 342, associated with virtual computing nodes on computing nodes A 302, B 304, and C 306. Virtual network 2 (VN2) has components 344, 346, 348 associated with virtual computing nodes on nodes A, C, and D 308.

As the Routing Manager module 336 directs network traffic on the substrate network 300, traffic can be directed flexibly and various network configurations and network costs can be considered. For example, routing paths can be determined based on specified performance levels for the virtual networks. In one embodiment, if the user for VN1 is entitled to a higher service level, such as for faster speed (e.g. lower latency and/or higher bandwidth), traffic associated with VN1 can be routed on a "fast" path of the substrate network 300. For example, in one embodiment, traffic for "platinum" users is prioritized over traffic for "gold" and "silver" users, with traffic from "gold" users prioritized over "silver" users. In one embodiment, at least some packets of the user with the higher service level are prioritized over packets of a user with a lower service level, for example, during times of network congestion. The user may be entitled to a higher level because the user has purchased the higher service level or earned the higher service level through good behavior, such as by paying bills, complying with the operator's policies and rules, not overusing the network, combinations of the same, or the like.

The Route Manager 336 can store user information or communicate with a data store containing user information in order to determine the target performance level for a virtual network. The data store can be implemented using databases, flat files, or any other type of computer storage architecture and can include user network configuration, payment data, user history, service levels, and/or the like. Typically, the Route Manager will have access to node and/or link characteristics for the substrate nodes and substrate links collected using various network monitoring technologies or routing protocols. The Route Manager can then select routes that correspond to a selected performance level for the virtual network and send these routes to the computing nodes. For example, network W 310 and Y 312 can be built on fiber optic lines while network Y 314 and Z 316 are built on regular copper wire. The Route Manager can receive network metrics data and determine that the optical lines are faster than the copper wires (or an administrator can designate the optical lines as a faster path). Thus, the Route Manager, in generating a route between node A 302 and node C 306 for "fast" VN1 traffic, would select a path going through network W and Y (e.g., path A-B-C).

In another situation, where the user for VN2 is not entitled to a higher service level, VN2 traffic from node A 302 to node B 306 can be assigned to a "slow" or default path through network Y 314 and Z 316 (e.g. path A-D-C). In order to track routing assignments, the Routing Manager can maintain the routes and/or route association in a data store, such as a Routing Information Base (RIB) or routing table 350. The Route Manager can also track the target performance criteria 351 associated with a particular virtual network.

In order to direct network traffic on the substrate network 300, the Routing Manager 336 can create forwarding entries for one or more of the Communication Manager modules 320, 322, 324, 326 that direct how network traffic is routed by the Communication Manager. The Communication Manager modules can store those entries in forwarding tables 352, 354, 356, or other similar data structure, associated with a Communication Manager. For example, for VN1, the Route Manager can generate a control signal or message, such as a forwarding entry 358, that directs VN1 traffic received or generated on node A 302 through network W 310 (on path A-B-C). Meanwhile, for VN2, the Route Manager can generate a control signal or message, such as a forwarding entry 360, which directs traffic received on node A through network Z. The Route Manager can send these forwarding entries to the node A Communication Manager 320, which can store them on its forwarding table 352. Thus, network traffic associated with VN1 and VN2, destined for node C 306 received or generated on node A can travel by either path A-B-C or path A-D-C based on the designated performance level for VN1 and VN2.

While the example of FIG. 3 depicts only two virtual networks, the Route Manager 336 can similarly generate and maintain routes for any number of virtual networks. Likewise, the substrate network 300 can include any number of computing nodes and/or physical network devices. Routes can be determined based on multiple performance criteria, such as network bandwidth, network security, network latency, and network reliability. For example, traffic for a virtual network suspected of being used for spamming (e.g. mass advertisement emailing) can be routed through network filters and scanners in order to reduce spam.

Figure 4A:
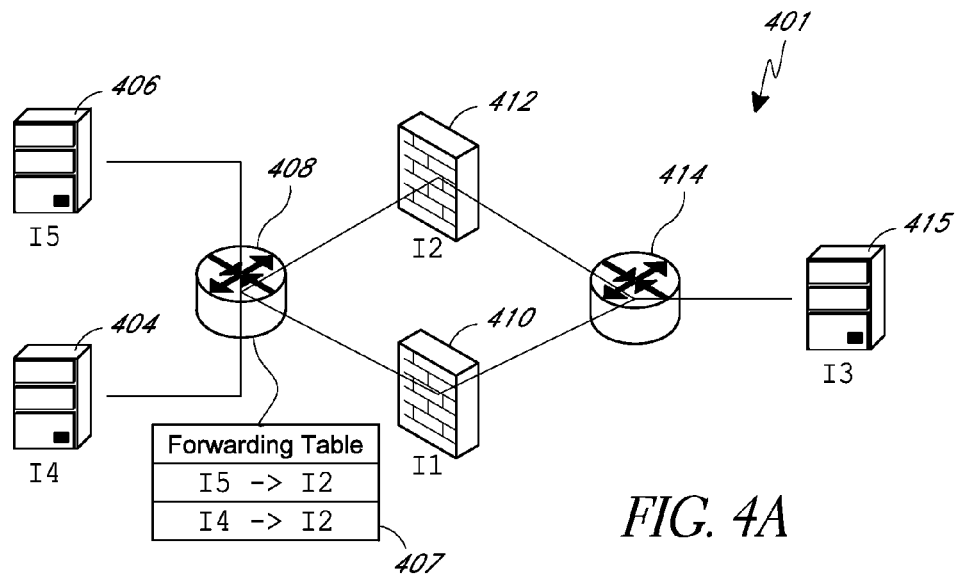
FIGS. 4A and 4B illustrate a virtual network and corresponding substrate network where substrate routing is independently determined from virtual routing.
Figure 4B:
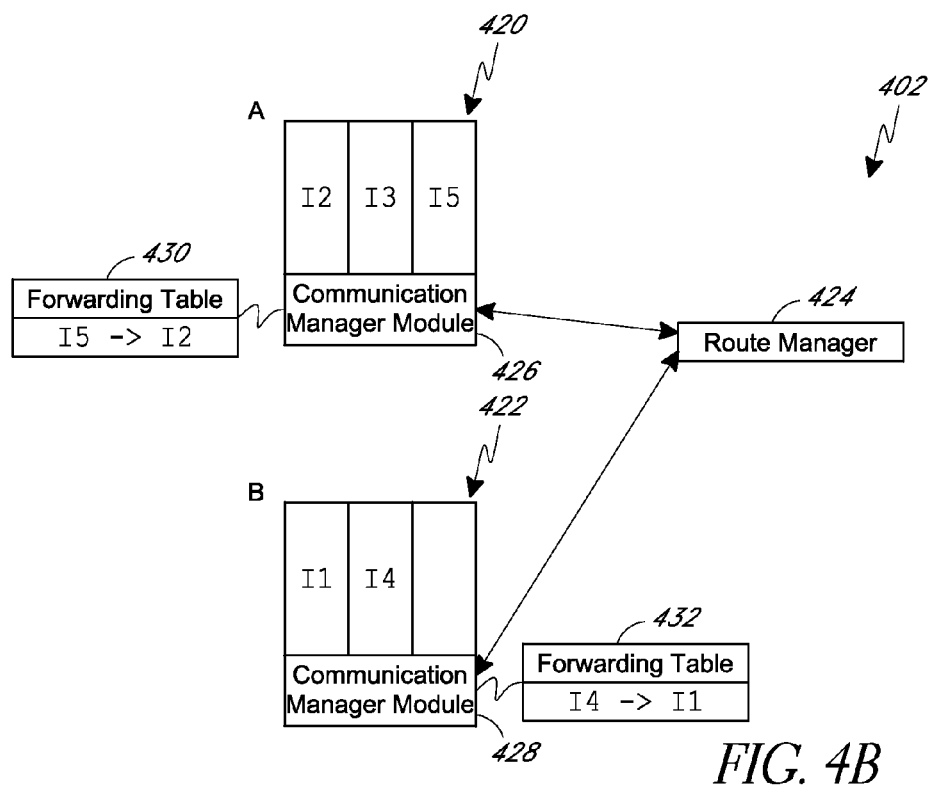

FIGS. 4A and 4B illustrate a virtual network 401 and corresponding substrate network 402 where substrate routing is independently determined from virtual routing. FIG. 4A illustrates a virtual network including several virtual network components. Virtual computing nodes I4 404 and I5 406 are connected to a logical router 408. The logical router can implement certain of the features described in the logical router 270a, 270b of FIG. 2. The logical router is connected to firewalls I1 410 and I2 412. The logical router is configured to direct traffic from I5 to I2 and I4 to I2, as would be the case if I2 were a backup firewall. The forwarding table associated with logical router 409 reflects this traffic configuration. I1 and I2 are connected to a second router 414. The second router is connected to another virtual computing node, I3 415. Thus, based on the topology and associated forwarding table of the virtual network 401, traffic from I4 and I5 to I3 passed through I2.

Meanwhile, FIG. 4B illustrates an example topology of the substrate network 402 associated with the virtual network 401. The substrate network includes computing node A 420, computing node B, and a Route Manager 424. Substrate nodes A and B are each associated with a Communication Manager 426, 428. Node A is simulating the operation of virtual components I2, I3 and I5 while Node B is simulating the operation of virtual components on I1 and I4 on their respective virtual machines. The Route Manager can then use information regarding the assignments of virtual components to computing nodes to optimize or otherwise adjust routing tables for the substrate network. The Route Manager can receive such information from the Communication Managers and/or the System Manager. For example, assuming I1 and I2 are identical virtual firewalls, the Route Manager can determine that because I5 and I2 are located on the same computing node, while I4 and I1 are located on the other node, virtual network traffic can be routed from I5 to I2 and from I4 to I1 without leaving the respective computing node, thus reducing traffic on the network. Such a configuration is reflected in the illustrated forwarding tables 430, 432 associated with the Communication Managers. Thus, routes on the substrate network can be determined independently of virtual network routes.

In some embodiments, the Route Manager 424 or System Manager can optimize or otherwise improve network traffic using other techniques. For example, with reference to FIGS. 4A and 4B, another instance of I3 can be operated on node B 422, in addition to the instance of I3 on node A. Thus, virtual network traffic from I5-I2-I3 and I4-I1-I3 can remain on the same computing node without having to send traffic between computing nodes A and B. In one embodiment, substrate traffic can be optimized or otherwise improved without having different forwarding entries on the substrate and the virtual network. For example, with reference to FIG. 4B, I4 can be moved from computing node B 422 to node A 420, thus allowing virtual traffic from I5 and I4 to I2 to remain on the same computing node. In this way, a user monitoring traffic on logical router 408 would see that traffic is flowing according the forwarding table in the router, that is, substrate routing is transparent to the user. Other techniques for optimizing traffic by changing the association of virtual components with virtual machines and/or duplicating components can also be used.

In some situations, it can be desired that substrate routes reflect routes specified in the virtual table. For example, the virtual network user can wish to control how traffic is routed in the substrate network. However, rather than giving the user access to the substrate network, which could put other users at risk or otherwise compromise security, a data center operator can propagate network configuration or virtual network characteristics specified by the user for the virtual network to the substrate network. This propagated data can be used in generating routing paths in the substrate network, thus allowing the user to affect substrate routing without exposing the substrate layer to the user.

Route Selection on Overlay/Virtual Network

Figure 5A:
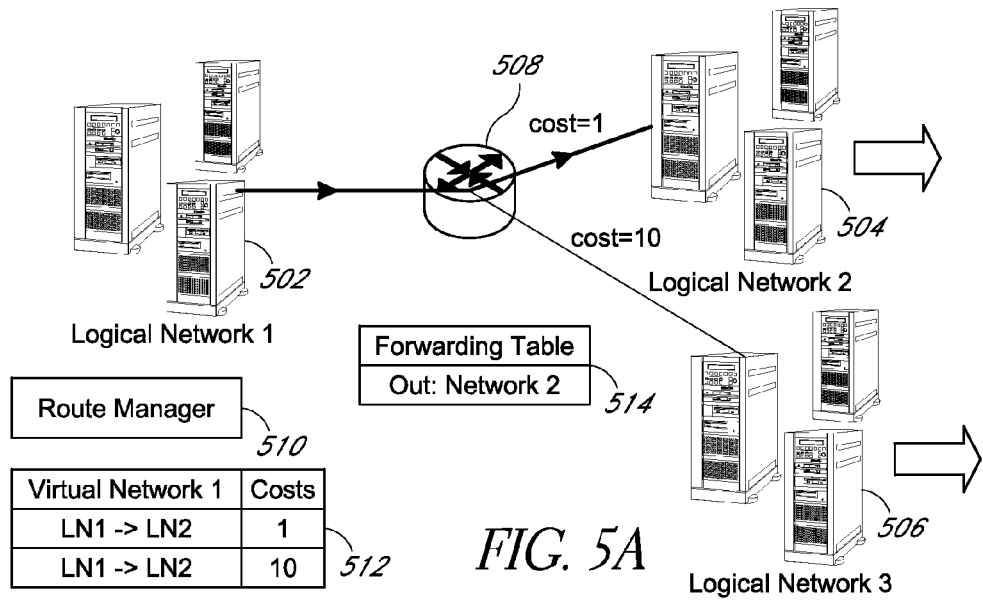
FIGS. 5A and 5B illustrate a virtual route selection propagated to the substrate network.
Figure 5B:
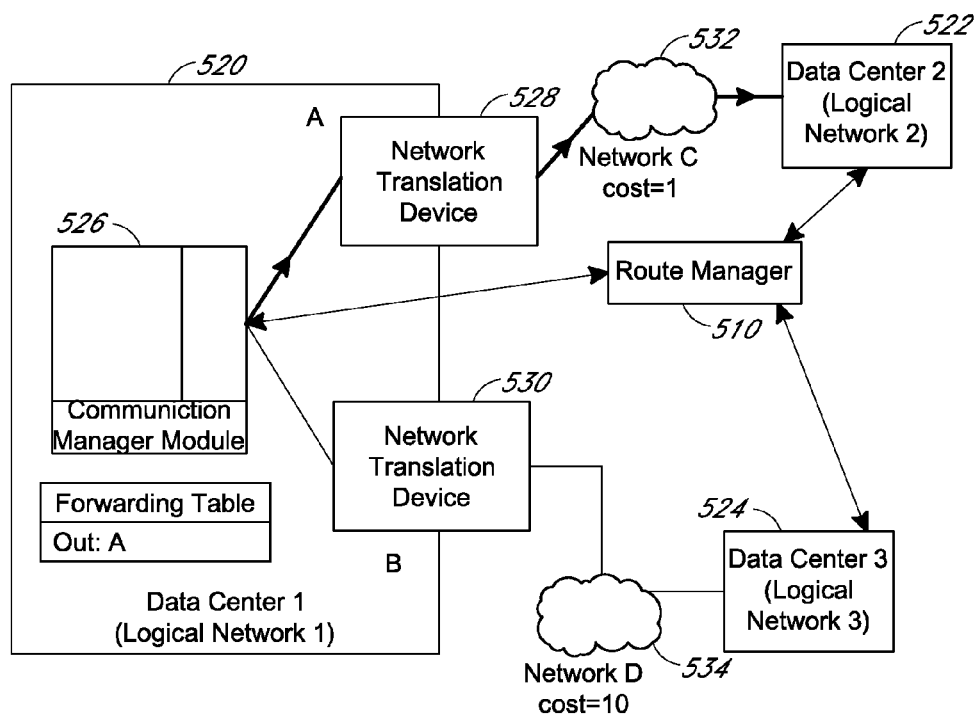

FIGS. 5A and 5B illustrate a virtual route selection propagated to the substrate network. FIG. 5A illustrates a virtual network topology where logical network 1 (LN1) 502 is connected to logical network 2 (LN2) 504 and logical network 3 (LN3) 506 by a logical router 508. The current preferred routing path specified by the user is from LN1 to LN2.

A user may wish to specify a route for various reasons. For example, routing costs through LN2 can be cheaper than LN3, such as when LN2 and LN3 are in different locations with different ISPs and one ISP charges lower rates than another. In another example, LN3 can be a backup virtual network for LN2, and used only in some situations, such as for handling overflow from LN2.

Referring back to FIG. 5A, the user can specify preferred routes through the virtual network and/or characteristics or costs associated with the virtual components, such as monetary costs, packet loss rates, reliability rate, and/or other metrics. These characteristics can be assigned to the virtual components, such as the virtual computing nodes, node links, logical routers/switches or the like. The Route Manager 510 can then determine routing tables 512 and/or forwarding tables 514 for the virtual network.

FIG. 5B illustrates an example of a substrate route that can correspond to the virtual route in FIG. 5A. In the figure, there are three data centers 520, 522, 524 corresponding to the logical networks 502, 504, 506 of FIG. 5A. In data center 1 (DC1), a computing node 526 is connected to a network translation device A (NTD A) 528 and a network translation device B (NTD B) 530. The network translation devices are connected to external networks C 532 and D 534, respectively.

The network translation devices can serve as a gateway or entry/exit point into the virtual network. In some embodiments, the network translation devices can translate between a first addressing protocol and a second addressing protocol. For example, if the virtual network is using IPv6 and the external networks are using IPv4, the network translation devices can translate from one addressing protocol to the other for traffic in either direction. In one embodiment, users connect from their private networks to the data centers via a VPN or other connection to a network translation device, which translates and/or filters the traffic between networks.

Referring back to FIG. 5B, network C 532 connects data center 2 522 to NTD A 528. Network D 534 connects data center 3 524 to NTD B 530. The Route Manager module 510 is in communication with data center 1 520, data center 2 522, and data center 3 524, particularly with the Communication Manager for the computing node 526.

From information associated with the virtual network, the Route Manager 510 can determine that the user wants to route traffic from LN1 to LN2. The Route Manager can then "favor" substrate routes associated with the LN1 to LN2 virtual path. For example, the Route Manager can specify a low routing cost (e.g. cost 1) for communications, such as data packets, travelling on Network C relative to Network D (e.g. cost 10) such that during route determination, routes through Network C are favored. In one embodiment, the Route Manager can apply a coefficient to stored substrate costs in order to favor one route over another. In another example, explicit routing paths can be set up corresponding to the virtual route. The Route Manager can identify routes in its routing table and communicate those routes with one or more Communication Managers.

Referring back to FIG. 5B, when the computing node 526 receives or generates a packet destined for LN2 or a network reachable from LN2, the computing node can be configured by the Route Manager to send packets through NTD A 528 as it lies on the route including network C 532.

By propagating virtual network configuration data to the substrate, and using that configuration data in substrate route calculation, a mechanism is provided for a virtual network user to affect substrate routing. In some embodiments, the virtual configuration data can be used in determining association of the virtual components with the substrate components. For example, components of the same virtual network can be associated with the same substrate computing node or on computing nodes connected to the same switch in order to minimize or otherwise improve substrate network traffic. Configuration data can also be provided the other way and, in some embodiments, the user and/or virtual network can be provided with additional substrate information, such as characteristics of the underlying associated substrate components (e.g. performance, costs) in order to make more informed routing decisions.

Figure 6:
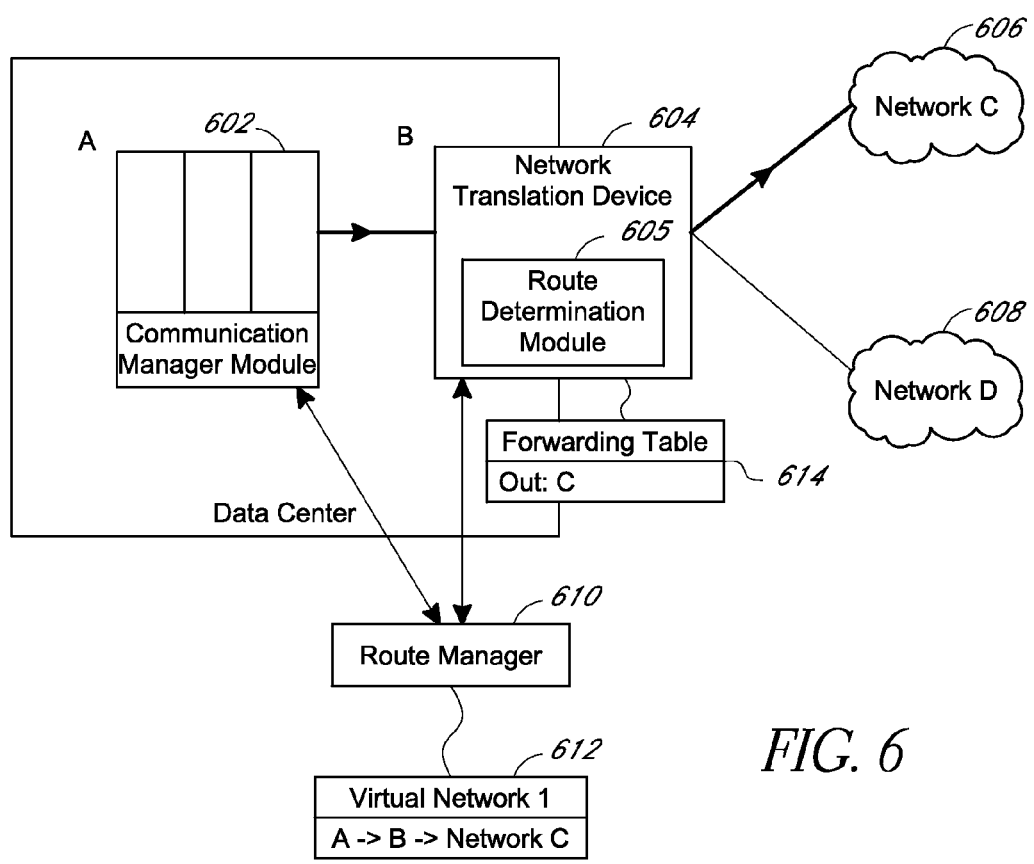
FIG. 6 illustrates an example embodiment of a substrate network, wherein a network translation device determines routes into or out of a virtual network.

FIG. 6 illustrates an example substrate network wherein a network translation device determines routes into or out of a virtual network. In FIG. 6, a communication, such as a data packet, leaves computing node A, which is associated with a virtual network, through NTD B 604. The network translation device can include a Route Determination module 605 for determining the packet route. NTD B is connected to network C 606 and network D 608.

In FIG. 6, the Route Manager 610 receives a network configuration or determines that route A-B-C is preferred or has a cheaper cost. The Route Manager can store the route in a routing table 612. The Route Manager can then send forwarding entries to the NTD B 604 that configure it to send traffic through network C 606. NTD B can contain multiple forwarding entries for multiple virtual networks, such that data for one virtual network can be sent through network C, while another virtual network sends data through network D. In some cases, network packets with the same source and/or destination are sent by different networks based on the associated virtual network.

In some embodiments, the substrate component may not have a Communication Manager or a Route Determination module and other ways of coordinating routing can be used. For example, a substrate component, such as an ordinary router or a network translation device, can be set up multiply on separate paths. Using blacklists, network traffic for a particular virtual network can be allowed on one path but blocked on others. The Route Manager can send a control signal or message updating the blacklists to manage the data flow.

In other embodiments, substrate components can implement IP aliasing, where, for example, "fast" path packets use one set of IP addresses, while "slow" path packets use another set of IP addresses. When the substrate component receives the packet, it can determine which path to use based on the IP address. The Route Manager can send a control signal or message to assign IP addresses to the components based on the type of traffic handled.

Other ways of differentiating how packets are handled by substrate components include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" path; and using Network Address Translation (NAT) devices on both ends of a network in order to redirect traffic into the network, such as by spoofing or altering an destination address for an incoming packing and/or altering an the source address of an outgoing packet. In some embodiments, the Route Manager generates control signals or messages for coordinating traffic on the substrate network for the various techniques described above.

Virtual Network Route Selection Process

Figure 7A:
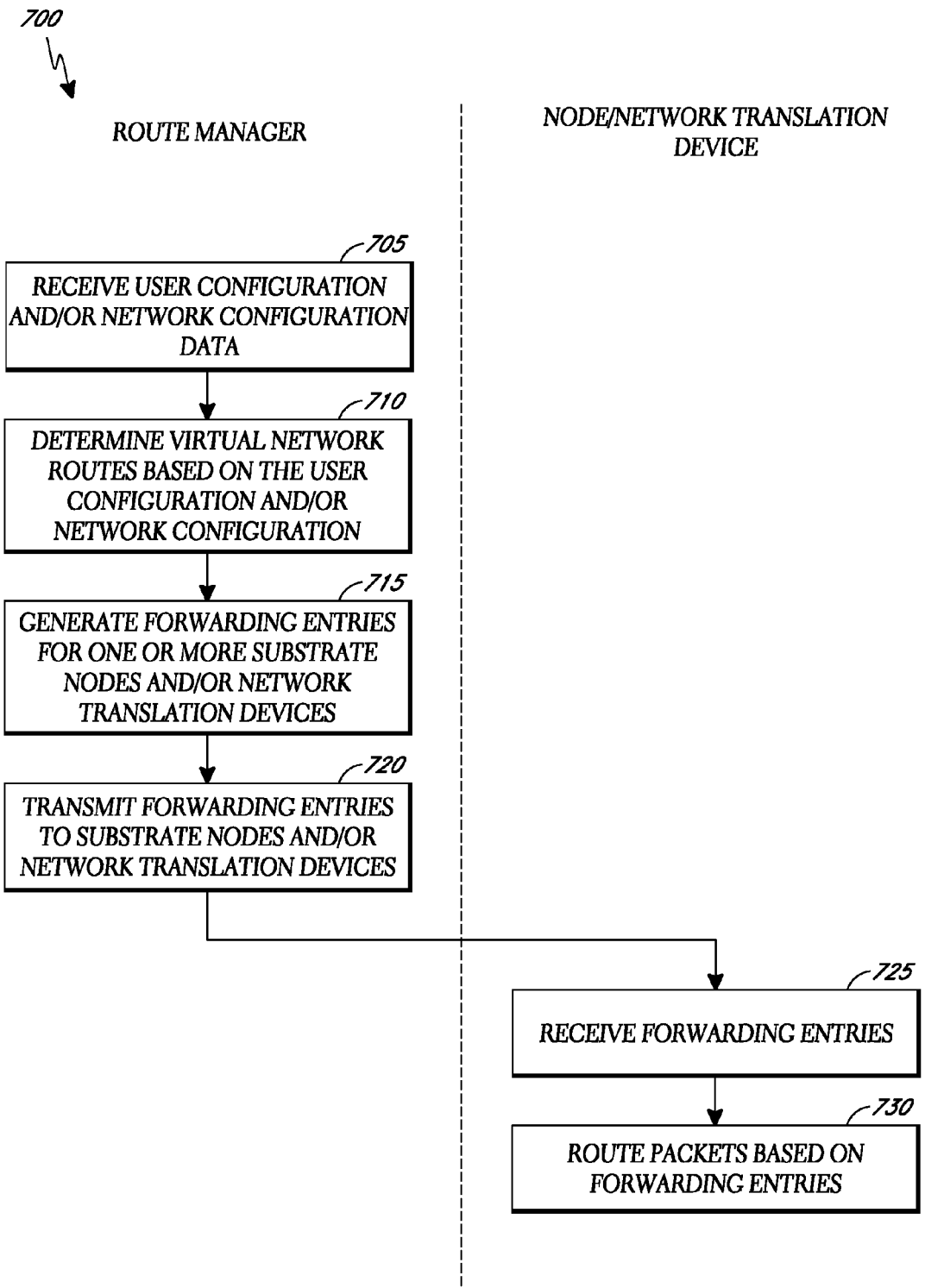
FIG. 7A illustrates a flow diagram for a process of propagating virtual routes to a substrate network.

FIG. 7A illustrates a flow diagram for a process 700 of propagating virtual routes to a substrate network usable in the example networks described above. The virtual routes can be based on network configuration data provided by a virtual network user, such as costs, component characteristics, preferred routes, and/or the like.

At block 705, the Route Manager module receives user configuration and/or network configuration data, such as, for example, policy based routing decisions made by the user. In some embodiments, a user interface is provided, allowing a user to specify configuration data. The Route Manager can receive the configuration data from a data store, for example, if user configuration and/or network configuration data are stored on the data store after being received on the user interface or otherwise generated. In some embodiments, the configuration data can include explicit routing paths through the virtual network. In some embodiments, the configuration data can specify associated costs for traversing components of the virtual network, such as links and/or nodes. These costs can be based on monetary costs, packet loss rates, reliability rate, and/or other metrics. These costs can be provided by the user to configure the virtual network provided by the data center operator. However, costs and other network configuration data can come from the data center operator themselves in addition to or instead of from the user. For example, the data center operator can use the virtual network to provide feedback to the user on routing costs, such as by associating monetary use costs for the substrate computing nodes and/or components. In one example, the data center operator can specify a high cost for a high speed network link or high powered computing node so that the virtual network user can take into account that cost in configuring the virtual network.

At block 710, the Route Manager module determines virtual network routes based on the user configuration and/or network configuration data. In some embodiments, routing protocols or the route determination algorithms of the routing protocols, such as BGP, OSPF, RIP, EIGRP or the like, can be used to determine virtual routes.

At block 715, the Route Manager determines one or more forwarding entries for substrate network components, such as computing nodes, network translation devices, or the like. As the Route Manager can determine routing paths and propagate routing decisions to the substrate components, the Route Manager can coordinate routing within a data center and/or between multiple data centers.

At block 720, the Route Manager transmits the forwarding entries to the substrate components. At block 725, the substrate component receives the forwarding entries. The substrate network components can store the forwarding entries in FIB tables or similar structures. Generally, a Communication Manager on the substrate component receives and processes the forwarding entry and manages communications of the substrate component.

However, as discussed above, network traffic can also be coordinated for substrate components without a Communication Manager using instead, for example, a NAT device or the like. In some embodiments, the Route Manager can send blacklist updates, manage tagging of the packets, generate stacked MAC addresses, or the like.

At block 730, the substrate components route packets received or generated according to the stored forwarding entries. Generally, a Communication Manager on the substrate component manages the packet routing and refers to the forwarding entries to make forwarding decisions.

Substrate Network Route Selection Process

Figure 7B:
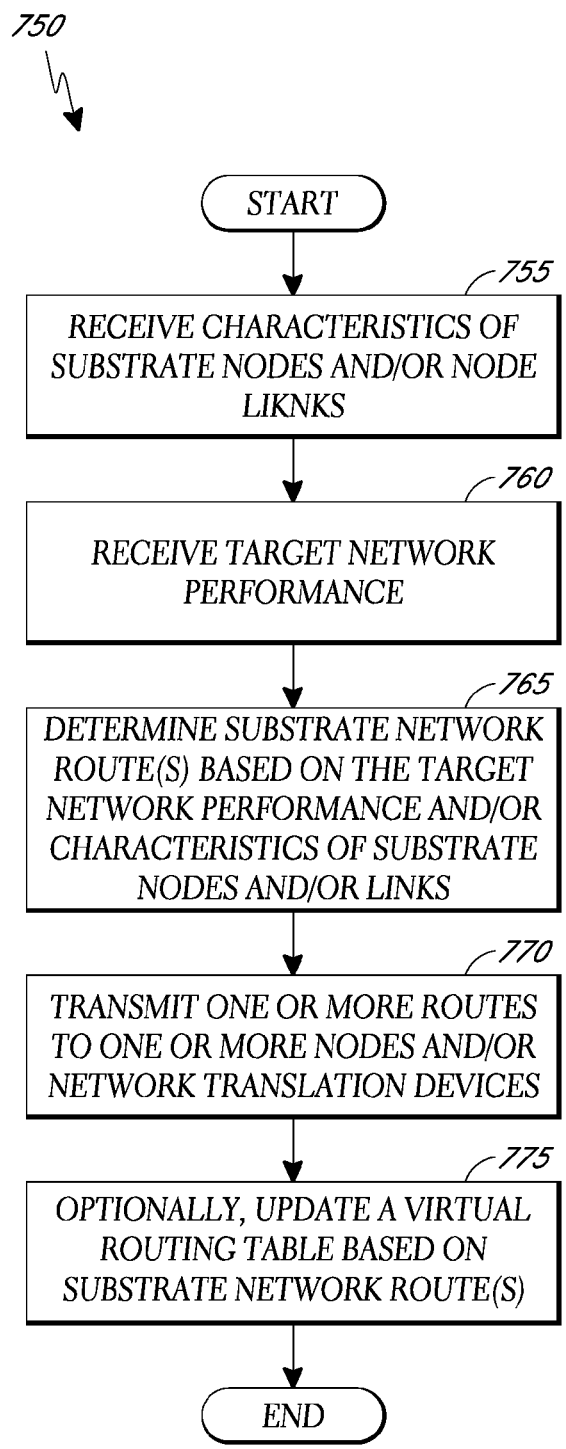
FIG. 7B illustrates a flow-diagram for a process of determining substrate routing based on target performance characteristics of the associated virtual network.

FIG. 7B illustrates a flow-diagram for a process 750 for determining substrate routing based on target performance characteristics of the associated virtual network usable in the example networks described above. In some instances, the Route Manager can optionally generate a virtual routing table for the virtual network before determining substrate routing. The virtual routing table can be used to determine virtual routing paths, allowing optimization of network traffic by selective association of the virtual network components with substrate computing nodes, such as by taking into account physical location and virtual network traffic patterns. However, generation of the virtual routing table is not necessary as the substrate routes can be determined independently of the virtual routes, as will be described below. In addition, user configuration and/or network configuration data provided by the user can be used to describe the virtual network, without needing to generate a virtual routing table.

At block 755, the Route Manager receives characteristics of the substrate nodes and/or node links. The Route Manager can receive the characteristics data from a data store. In some embodiments, a user interface is provided, allowing a user to specify characteristics data. The characteristics can describe such things as monetary costs, network bandwidth, network security, network latency, network reliability and/or the like. These characteristics can be used in a cost function for determining substrate routing paths. This information can be kept by the Route Manager or data source accessible by the Route Manager.

At block 760, the Route Manager receives a target network performance for the virtual network. The target performance can be based on a purchased service level by the user, user history, security data or the like. For example, a service level purchased by a user can have minimum bandwidth, latency, or quality of service requirements. In another example, a user can be a new customer with an unknown payment history such that the user is provisioned on a "slow" virtual network in order to minimize incurred expenses in case the user fails to pay. In another example, a user identified as carrying dangerous or prohibited traffic, such as viruses, spam or the like, can be quarantined to particular substrate components. During quarantine, the virtual network components can be assigned to specialized substrate components with more robust security features. For example, the substrate components can have additional monitoring functionally, such as a deep-packet scanning ability, or have limited connectivity from the rest of the substrate network.

At block 765, the Route Manager determines substrate network routes based on the target network performance and/or characteristics of the substrate nodes and/or links. In one embodiment, the Route Manager can use the characteristic data in a cost function for determining routes. Which characteristic to use or what level of service to provide can be determined by the performance criteria or target performance. For example, for a "fast" route, the Route Manager can use bandwidth and/or latency data for the substrate network to generate routes that minimize latency, maximize available bandwidth, and/or otherwise improve network performance.

The Route Manager can re-determine routes as needed based on changes in the network, the configuration data, and/or the performance level. For example, if a user has purchased N gigabits of "fast" routing but has reached the limit, the Route Manager can generate new routes and shift the user to "slow" routing.

At block 770, the Route Manager transmits forwarding entries for one or more routes to one or more nodes and/or network translation devices. In some embodiments, the Route Manager determines forwarding entries for the substrate components and sends those forwarding entries to the substrate components on the path. In some embodiments, the Route Manager can send blacklist updates, manage tagging of data packets, and/or generate stacked MAC addresses.

At block 775, the Route Manager can optionally update the virtual routing table based on substrate network routes. By changing the virtual network routing table based on the substrate routes, the virtual network can stay logically consistent with the behavior of the substrate network. Thus, users won't necessarily be confused by discrepancies in the virtual routing.

Metering Network Requests

Figure 8:
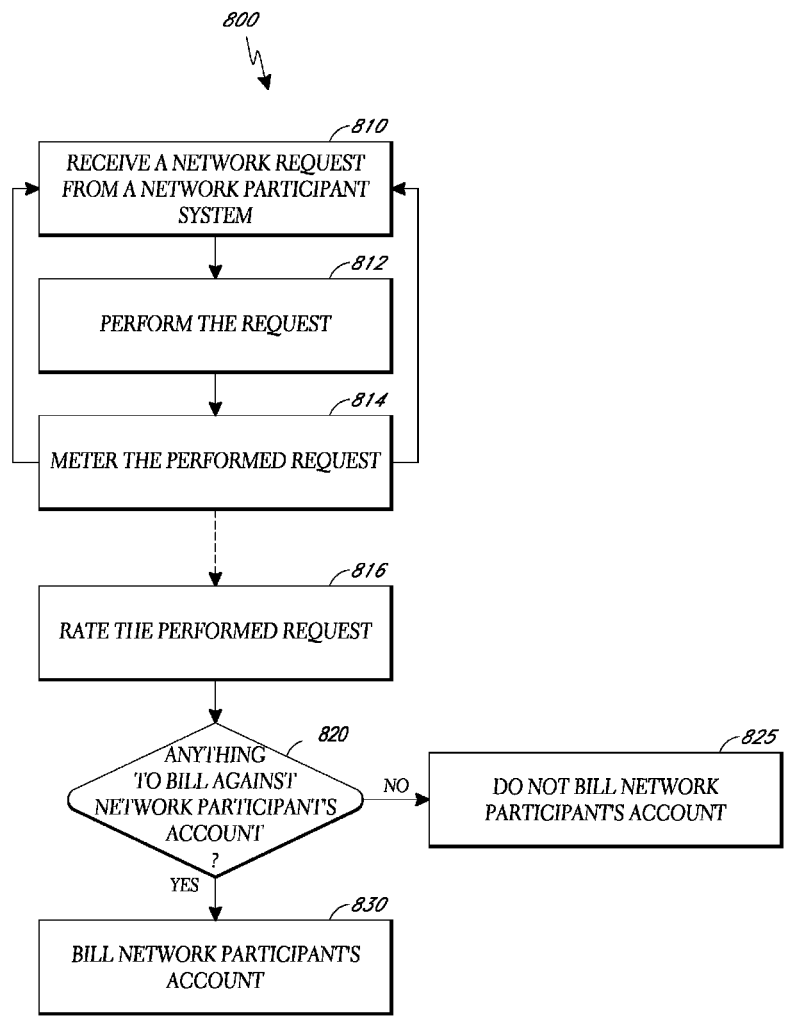
FIG. 8 depicts a method for routing metering.

FIG. 8 depicts a method 800 for routing metering. As discussed above, routes can be maintained for virtual networks and substrate networks. Additionally, packets can be forwarded and switched through various virtual and physical routers. Together, requests for changing virtual or substrate routing and requests to forward or switch various packets can be referred to as requests for network actions, such as network control plane actions or data plane actions. In block 810, a request is received for a network action from a network participant system, such as a computing node, a logical router, a communication manager module, or various other virtual or physical computer systems described with respect to FIGS. 1-7, and 9 and known to those skilled in the art. For example, in some embodiments, a network participant can be a virtual machine 107a-107d, a host computing system 105a-105d, a VM Communication Manager module 109a-109d, a computing system 145a-145b or 155a-155n, a computing node 205a or 255b, a logical router 270a-270b, a virtual network, such as VN1 or VN2 of FIG. 3, a virtual computing node 404, 406, or 415, a logical router 408 or 414, a computing node 424 or 422, a logical network 502, 504, or 506, a logical router 508, a computing node 526, a data center 520, 522, or 524, a computing node 602, a route manager 610.

After the request has been received, then the requested action is performed (in block 812) and metered (in block 814). The network requests may include routing table updates, storing a routing table, updating a stored routing table, retrieving a stored routing table, updating an access list, updating firewall filters, changing quality of service (QOS) configurations, packet forwarding, and requests related to numerous other network control plane and data plane actions, such as those discussed herein. Metering the requested action in block 812 can include storing information about the performed request, including timing information, network participant information, size of the request, and any other appropriate information.

As depicted by the arrows pointing from block 814 to block 810, multiple network requests may be received (block 810), performed (block 812) and metered (block 814) before the events are rated in block 816. In some embodiments, the performed network requests may be rated in block 816 after a predetermined period of time, such as one day, one week, or one month. In some embodiments, block 816 is performed after a predetermined number of network requests have been performed, such as, for example, one, fifty one hundred, or ten thousand requests.

Rating the performed network actions in block 816 may include determining a rate, charge, or cost for each performed action separately or performing an aggregate analysis on a subset or all of the performed actions and determining a rate based on the aggregate analysis. For example, in some embodiments, a participant's account may be charged a fixed amount for each network action of a particular type. As another example, a network participant's account may not be charged for a first set of network requests during a particular time period (e.g., 100 routing table updates on a particular day), but be charged a rate for those network requests performed after that time period. In some embodiments, a network participant's account may be charged a first rate for a first set of network requests in a particular time period (e.g., $0.10 for each of the first 100 routing table updates per day) and a second rate for subsequent network requests (e.g., $0.05 for each routing table update after the first 100 on a given day). Additionally, in some embodiments, different network actions can be associated with different costs (e.g., an update to a network routing table may cost $0.10, but retrieving an archived network routing table may cost $0.25). Other rating calculations and combinations of rating calculations may also be used in various embodiments.

In various embodiments, the rating determination for a requested network action can depend on the previous actions that have been requested by the network participant system. For example, the currently-received request for a network action can be viewed in the context of network action requests previously received from the network participant system. For example, a network participant system, such as a transit provider, that network is announcing routing changes rapidly can put a strain on the resources of the system receiving these routing announcements. Therefore, although the first few announcements for routing changes may not be rated as billable events (e.g., requests for which an account associated with a network participant system can be charged), subsequent routing change announcements can be billable.

In some embodiments, "undesirable" data plane action requests, such as those that violate network rules, that might otherwise be dampened or stopped can instead be rated as billable events, especially if seen in excess or seen at more than a threshold rate. These charges can be made upon agreement with a network participant in some embodiments. As an example, data plane action requests that violate a network rule, such as failing to comply with a network standard, can be rated as billable. One such network standard is the Transmission Control Protocol (TCP) standard. According to this standard, TCP connections generally use a "slow start" mechanism, where packet sizes are slowly increased over time, depending on network congestion. If a network participant system complies with the TCP slow start mechanism, in one embodiment the packets sent as part of that protocol are not billable. If, however, the network participant system does not obey the TCP slow start protocol, and sends more data than it should initially, then the sending of that extra data can be a billable event for which the network participant system's account will be charged. One example of a data plane action that may be associated with higher rates and billing is multicast addressing. A network participant that sends packets via multicast addressing may have those packets rated at a higher cost than other packets sent using other protocols.

As another example, a slow rate of updates to routing or forwarding table might not be billable, but if a network participant updates a routing or forwarding table at over a threshold rate, then the participant can be billed for that action. As such, well-behaved customers can pay nothing or very little for their routing changes and malicious or careless customers can pay much more. As such, in some embodiments, the system can disincentivize bad behavior and incentivize good behavior.

There are numerous other network actions (such as network control plane and data plane actions) that can be billable. In some embodiments, if a network participant system announces more than a threshold number of routing changes during a particular time period, then the routing changes announced after the threshold has been met can be billable. For example, link failures and other transient network events can account for a few route changes per hour, but if a network participant system announces more than some threshold number of route changes, such as 60 route changes, during a single hour, then a network participant system can be in a situation in which it is failing. Requested routing changes from such a network participant system might normally be ignored. However, if a network participant system is willing to pay for the additional resources needed to keep up with the rapid changes it is announcing, then those announcements can be accepted and rated as billable, and an account associated with the network participant system can be charged.

In some embodiments, a network participant system can be charged for requesting more than a threshold number of packets to be forwarded or switched. For example, considering a network participant system in terms of the bandwidth that it is sending, if it sends more than a threshold amount of data during a particular time period, then it can be charged for the additional data sent. Additionally, in some embodiments, the amount to charge for the additional data sent by the network participant system can increase linearly with the amount of data sent, exponentially with the amount of data sent, or based on any other function or equation. For example, a network participant system can be charged a certain amount for sending up to 50 kB per second, a different amount for sending up to 100 kB per second, and yet a different amount is more than 100 kB per second is sent. Other rating schemes can also be used, in some embodiments, to charge for total data sent. A network participant system can be charged $1 per MB sent up to 10 MB, $0.50 for each subsequent MB up to 100 MB, and $2 for each MB sent thereafter. The amounts described herein are merely illustrative examples and can be varied in many implementations and embodiments. In some embodiments, other factors can also influence the amount charged to the network participant system. For example, discounts or increases can be applied based at least partly on relationships with network participant system, duration of subscription or service, historical performance of the network participant system, or any other appropriate factor.

In some embodiments, the amount to charge for a particular billable event can be determined based at least partly on the historic performance or reputation of the network participant system. For example, if a particular network participant system is known to fail often, then it can be charged a higher amount in order to announce more than a threshold number of network routing changes. As another example, if a network participant system is suspected or has a history of sending out spam, other inappropriate packets, or with any other undesirable behavior, as determined by any appropriate means, then the network participant system can be charged more for sending more than a certain number of packets per minute or other time period. Discussion of reputation based networking is presented in "Reputation-Based Routing,", U.S. patent application Ser. No. 12/825,824, filed Jun. 29, 2010, which is hereby incorporated in its entirety for all purposes.

Returning again to FIG. 8, in block 820, a determination is made whether to bill an account associated with the network participant. If rating the requested network action or actions in block 816 did not result in a charge to the network participant's account, then in block 825 an account associated with the network participant is not charged. If rating the requested network action or actions in block 816 did result in a charge being associated with the network participant's account, then in block 830 the account associated with the network participant is charged.

The method 800 of FIG. 8 can be performed on the various embodiments and virtual and physical systems described herein. For example, as depicted in FIG. 3, route manager 336 can receive requests for network actions in the form of virtual network routing updates from virtual network VN1, which has components 338, 340, and 342. If VN1 requests more than a certain threshold number of routing changes during a predetermined time period, then, in some embodiments, the additional requests for routing changes above the threshold can either be denied, if the client associated with VN1 is not willing to pay for those additional updates, or metered, if the client is willing to pay. As another example, a Communication Manager module, such as 210 in FIG. 2, can perform routing metering. Similarly, any of Communication Manager modules 320, 322, 324, 326, 420, 422, 526, 602; Route Manager 336, 424, 510, 610; System Determination module 605; network flow analysis boxes 830; 1030; 1130 can perform routing metering either alone or in combination with other modules. In some embodiments, routing metering is performed on the virtual network. For example, two-tiered intrusion analysis can be performed in a virtual network by logical routers 270*a*, 270*b*, 408, 508 or any other appropriate virtual module or set of modules.

Figure 9:
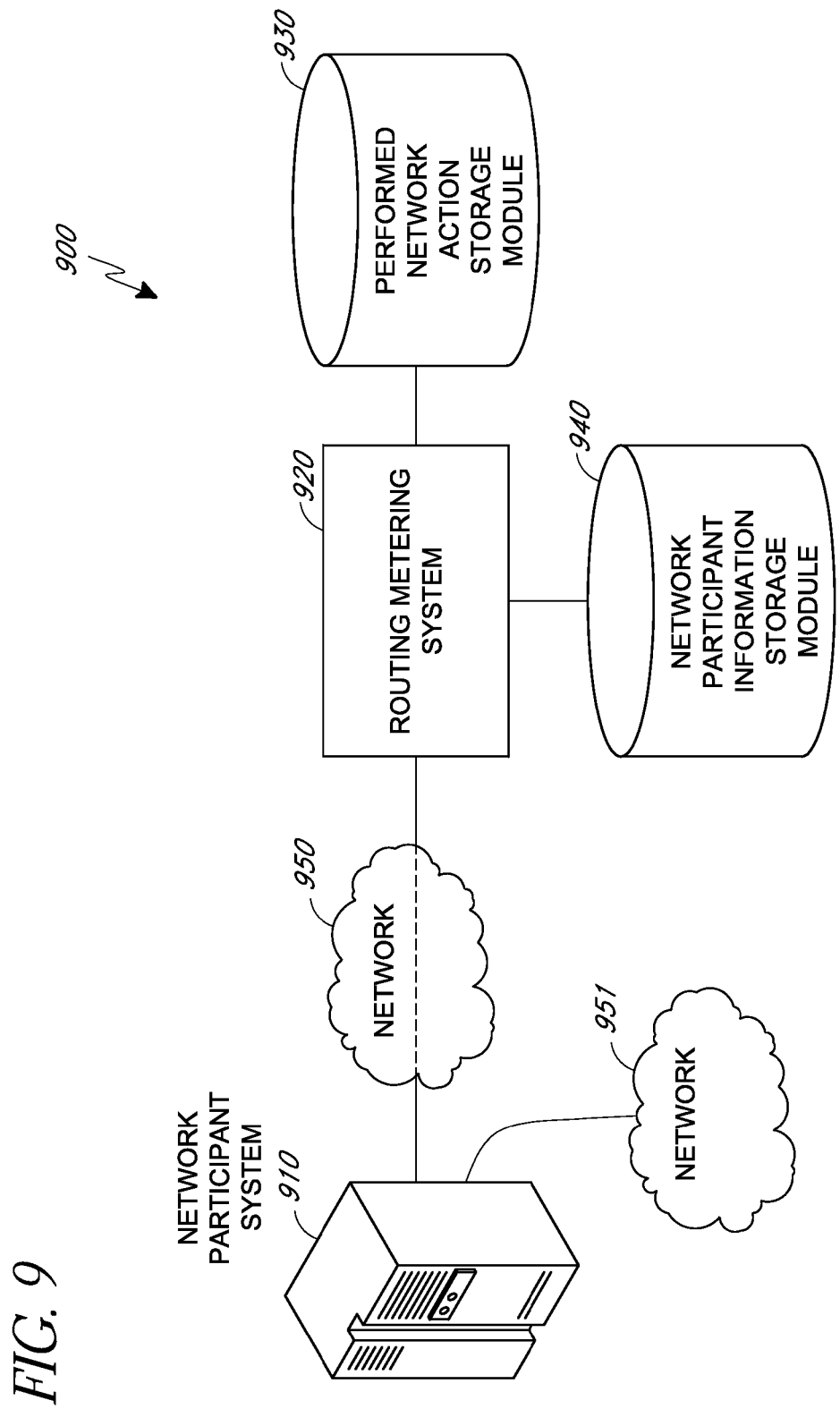
FIG. 9 depicts an network including a routing metering system.

As another example, consider the system 900 represented in FIG. 9. The system 900 can implement the features of the method 800 described above. In the depicted embodiment of FIG. 9, a network participant system 910 is connected to a routing metering system 920 over a network 950. The network participant system could be a physical computer or a virtual machine or computing node, such as that depicted in FIG. 1. The network participant system 910 can be coupled to another network 951. The routing metering system 920 can be coupled to a network participant information storage module 940 and a performed network actions storage module 930. The routing metering system 920 can include a virtual or logical router or a substrate router, such as those discussed elsewhere herein. The routing metering system can also include one or more other computational nodes that perform one or more of the actions required by the routing metering system 920.

If the method 800 of FIG. 8 is performed by the system 900, then the routing metering system 920 can receive requests for network actions, such as updating a routing table or forwarding or switching a packet, from the network participant system 910. The routing metering system 920 can also perform the requested network control plan action, store a record of the performed action in the performed network actions storage module 930, and, rate the performed network action. In some embodiments, the rate for the performed action can also be based on other performed network actions as well as based on the network participant information in the network participant information storage module 940, such as how many network routing changes the network participant system 910 has announced over the past hour. A network action requested by the network participant system 910 can include data plane actions, such as forwarding or switching a packet from network 951 or 950, requesting a routing change for network 951 or 950, or any other appropriate action. The network participant information storage module 940 and performed network actions storage module 930 can take any appropriate form, such as, databases, flat files, in-memory storage, long-term storage, or any other appropriate form.

Figure 10:
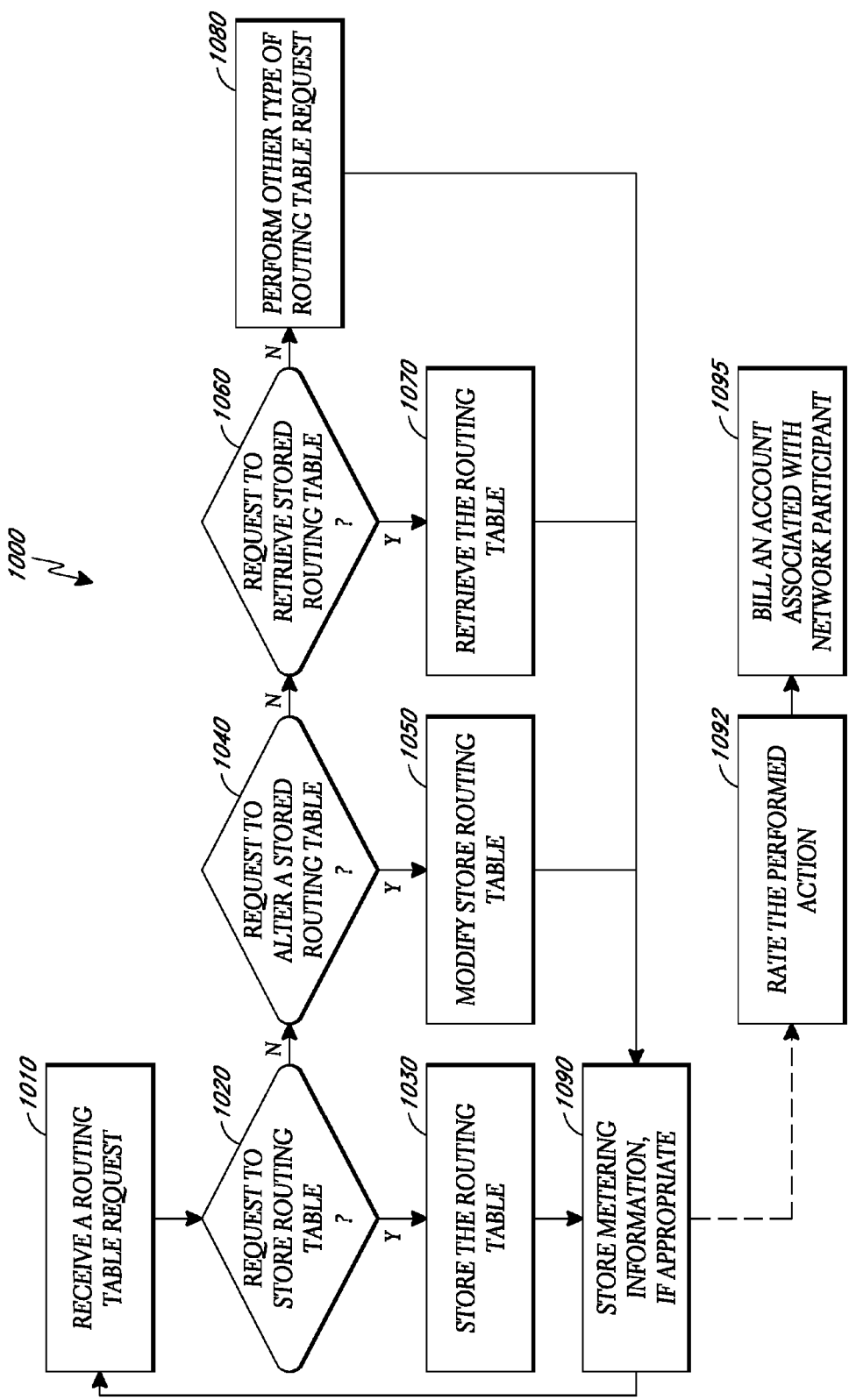
FIG. 10 depicts a method for metering in the context of routing table archiving.

FIG. 10 depicts a method 1000 of processing routing table requests related to storage, retrieval, and archiving of network routing and forwarding tables. The method 1000 can be implemented with any of the systems described herein. As discussed above, a network routing or forwarding table can take many forms including a FIB and a RIB 350 of FIG. 3, a forwarding table 352, 354, and/or 356 of FIG. 3, forwarding tables 430 and/or 432 of FIG. 4, routing tables 512 and/or forwarding tables 514 of FIG. 5, and/or routing table 612 or forwarding table 614 of FIG. 6, as well as any other appropriate routing or forwarding table discussed herein. Method 1000 can be performed as part of method 800, or the two methods can be performed separately.

In the method 1000, routing table archiving (for possible roll-back of the routing table), updating, and/or retrieval can be provided. The routing tables can be stored in XML or any other appropriate format. After a routing table request is received in block 1010, in blocks 1020, 1040, 1060, and 1080 the type of routing table request is determined. In blocks 1030, 1050, 1070, and 1080 the requested routing table action is performed. In block 1090, the performance of the requested routing table action is metered. As depicted by the arrow from block 1090 to block 1010, multiple requests can be received, processed, and metered. As depicted by the dashed line from block 1090 to block 1092, in some embodiments, after the action or actions are performed and metered, the action or actions are rated. The performed action may be rated as soon as it is metered or numerous metered actions may be rated together at some time after they have been metered. For example, in some embodiments, some or all of the metered actions may be rated monthly in order to produce a monthly bill for an account associated with the network participant. Further, the amount to charge the account associated with the network participant may be determined based on the metered events taken in aggregate. For example, a network participant may not be charged for the first 100 routing table requests, but may be charged for those routing table requests after the first 100. As another example, the network participant's account may be charged a first rate (e.g., $0.10) for the first 100 routing table requests and a second amount (e.g., $0.05) for subsequent routing table requests. In some embodiments, the performed actions may also be rated based on the content of the request. For example, if the request was to store a large routing table, then the charge for that request may be higher than it would be for storing a smaller routing table. The same increased charge may also apply for requests to update, retrieve, or modify large routing tables.

After the performed actions have been rated, an account associated with the network participant can be charged, in block 1095, based on the stored metering information related to the routing table requests. An example of a routing table 1100 is depicted in FIG. 11. An example of a portion of an XML file for a routing table is depicted as XML file 1120 in FIG. 11.

In block 1010, a network routing action in the form of a routing table request is received. As noted above, the requested routing table action could be the storage of a routing table, a request to alter a stored routing table, a request to retrieve a stored routing table, or any other appropriate routing table request. The routing table request can be received from any appropriate network participant system, such as virtual network VN1 in FIG. 3, or others discussed herein and known to those skilled in the art. In some embodiments, a routing metering system 920 can receive routing table requests from a network participant system 910, as depicted in FIG. 9.

After the routing table request has been received in block 1010, a check is performed in block 1020 to determine whether the request is a request to store a routing table (such as a RIB or a FIB). If the request is a request to store a routing table, then in block 1030, the routing table is stored. Storing a routing table can take many forms. If, for example, a network participant system 910, as depicted in FIG. 9, sends a request to store a routing table to routing metering system 920, then routing metering system 920 can store the routing table in the network participant information storage module 940. Additionally, as depicted in block 1090, the storage of the routing table can be recorded in the performed network actions storage module 930, of FIG. 9, rated as part of block 1092 and later have any rated charge billed to the network participant as part of block 1095, of FIG. 10.

If the request is not a request to store a routing table, then in block 1040 a determination is made as to whether the routing table request is a request to alter a stored routing table. If the request received in block 1010 is a request to alter a stored routing table, as determined in block 1040, then in block 1050 the stored routing table is altered. A request to alter a stored routing table can take many forms. For example, referring to FIG. 11, a request to alter a single cell on routing table 1100 can identify that cell and provide a replacement value. If the XML file 1120 is a portion of an XML of the representation of the routing table 1100, then a request to alter a single cell can identify a particular network, such as network ID1, and provide a modified value for one of the other cells, such as the associated network hop 1114. As an example of information that could be stored in a routing table 1100 and/or an XML file 1120, in some embodiments, a network ID, such as network ID 1110 in routing table 1100, can include a destination address and/or prefix information. A request to alter a stored routing table can also include a routing update for the routing table. For example, if a routing announcement is sent with the request to update a stored routing table, then the routing table can be updated with the received routing announcement. The routing update can be applied to the routing table in order to produce a new routing table.

If the request received in block 1010 is neither a request to store a routing table nor a request to alter a stored roundtable, then a check can be made in block 1060 to determine whether the request received in block 1010 is a request to retrieve a stored routing table. If the received request is a request to retrieve a stored routing table, then in block 1070 the stored routing table is retrieved. The retrieval of the stored routing table can be performed by any appropriate means or functions. For example, if the routing table is stored as an XML file 1120, as depicted in FIG. 11, then block 1070 can include retrieving the stored routing table in the form of the XML file 1120, from, for example, a network participant information storage module 940, as depicted in FIG. 9. In whatever form the routing table is stored, in some embodiments, it is retrieved and sent to the requester as part of block 1070.

In some embodiments, actions other than storing a routing table, altering a stored routing table, and retrieving a stored routing table, can be performed. This is depicted by block 1080. For example, there can be a routing table request to delete a routing table. In some embodiments, a network participant system can be able to request an archived or previous version of a routing table, or a routing table that was active or current at a particular time in the past (such a request might also be performed as part of block 1060). For example, each time a routing table is stored or altered, a previous version of the routing table can be stored as part of a revision control system, which, in some embodiments, can be part of a routing metering system 920 and have revisions stored in a network participant information storage module 940. Upon subsequent request for an archived version, the revision control system can retrieve the older version and return it to the requester. In some embodiments, this can be useful to allow a requester to keep a history of prior routing tables for debugging purposes or in order to "roll back" a routing table in its system. The blocks 1020, 1040, 1060, and 1080 can be performed in any order and can be part of a single check determining the type of routing request.

As discussed above, after a routing table has been stored, altered, retrieved, or any other action performed, then in block 1090 metering information may be stored. In step 1092, a rating determination can be made regarding whether and how much to charge an account associated with the network participant based at least partly on the performed routing action or actions. Some or all of the actions related to the routing tables can be rated and billed. For example, in some embodiments, storing and modifying routing tables can be a billable event, but retrieving the routing table may not be. In other embodiments, all of these actions are metered and rated, and are associated with different monetary charges.

When it is time to charge an account associated with the network participant, then, in block 1095, that account is charged. An account associated with the network participant can be charged every time a billable request is performed, or can be charged on some predetermined interval, such as monthly, weekly, or daily.

Terminology

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "can," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for routing metering, the system comprising:
a routing metering system comprising one or more processors, the routing metering system configured to:
receive a routing table request from a network participant system to update a stored routing table, the routing table request comprising multiple requested routing table actions;
perform the requested update to the stored routing table only if an entity associated with the network participant system agrees to pay to have the requested routing table actions, taken in aggregate, performed;
meter the performed update;
rate the performed update to determine a billable monetary cost associated with the performed update; and
in response to the performed update having a billable monetary cost, charge an account associated with the network participant system based at least in part on the performed update to the stored routing table.

2. The system of claim 1, wherein the requested update to the stored routing table comprises archiving a new version of the stored routing table.

3. The system of claim 1, wherein the requested update to the stored routing table comprises altering the stored version of the network routing table.

4. The system of claim 1, wherein the requested update to the stored routing table comprises producing a new routing table based on a previous routing table and a routing update.

5. The system of claim 1, wherein the routing metering system is configured to rate the performed update by at least rating the performed update based on the multiple routing table actions, taken in aggregate.

6. A method for routing metering, the method comprising:
by a computer system comprising computer hardware:
receiving at a routing metering system from a network participant system a request to perform multiple routing actions;
performing the requested multiple routing table actions;
storing a record of performing the requested multiple routing table actions;
determining a cost to bill an account associated with the network participant system, said cost determined at least in part based on the stored record of the performed multiple routing table actions; and
applying the cost to the account associated with the network participant system,
wherein the multiple network routing actions, taken in aggregate, are performed in response to an indication that an entity associated with the network participant system agrees to pay to have the multiple network routing actions performed.

7. The method of claim 6, wherein the requested multiple routing table actions comprises a routing announcement.

8. The method of claim 6, wherein the requested multiple routing table actions comprises an action to be taken with respect to a forwarding table.

9. The method of claim 6, wherein the requested multiple routing table actions comprises an action selected from the group consisting of archiving the network routing table, returning a copy of a stored version of the network routing table, and updating a stored version of the network routing table.

10. The method of claim 6, wherein the requested multiple routing table actions comprises producing a new routing table based on a previous routing table and a routing update.

11. The method of claim 6, wherein the requested multiple routing table actions comprises archiving of a forwarding information base or routing information base sent by the network participant system.

12. The method of claim 6, wherein the cost to bill the account associated with the network participant system is determined at least in part based on a reputation of the network participant system.

13. The method of claim 6, wherein the cost to bill the account associated with the network participant system is determined at least in part based on an extent to which the requested multiple routing table actions are associated with an undesirable behavior.

14. The method of claim 6, wherein determining a cost comprises rating the performed update based on an aggregation of the multiple routing table actions.

15. The method of claim 6, wherein the performed multiple routing table actions comprises storing a routing table that is greater than a predetermined size and determining the cost to bill the account comprises billing the account based at least in part on the size of the routing table.

16. The method of claim 6, wherein said determining the cost to bill comprises analyzing a history of network control plane actions requested by the network participant.

17. The method of claim 6, wherein said determining the cost to bill comprises determining whether more than a threshold number of routing announcements have been received from the network participant.

18. A non-transitory computer-readable storage medium comprising computer-executable instructions for performing a method of routing metering, the method comprising:
receiving a request from a network participant system to perform multiple routing table actions on behalf of the network participant system;
performing the requested multiple routing table actions only if an entity associated with the network participant system agrees to pay to have the multiple routing table actions performed;
metering the performed multiple routing table actions;
applying a charge to an account associated with the network participant system based at least in part on performing the multiple routing table actions; and
billing the account at least in part based on the charge.

19. The non-transitory computer-readable storage medium of claim 18, wherein the multiple routing table actions comprise an action to be taken with respect to a forwarding table.

20. The non-transitory computer-readable storage medium of claim 18, wherein the multiple routing table actions comprise a routing announcement.

21. The non-transitory computer-readable storage medium of claim 18, wherein the multiple routing table actions comprise producing a new routing table based on a previous routing table and a routing update.

* * * * *